Oct. 4, 1927.

F. M. HARGRAVE 1,644,583

CUTTING MECHANISM

Original Filed Sept. 15, 1925    3 Sheets-Sheet 1

F. M. Hargrave, INVENTOR.

BY

Geo. P. Kimmel ATTORNEY.

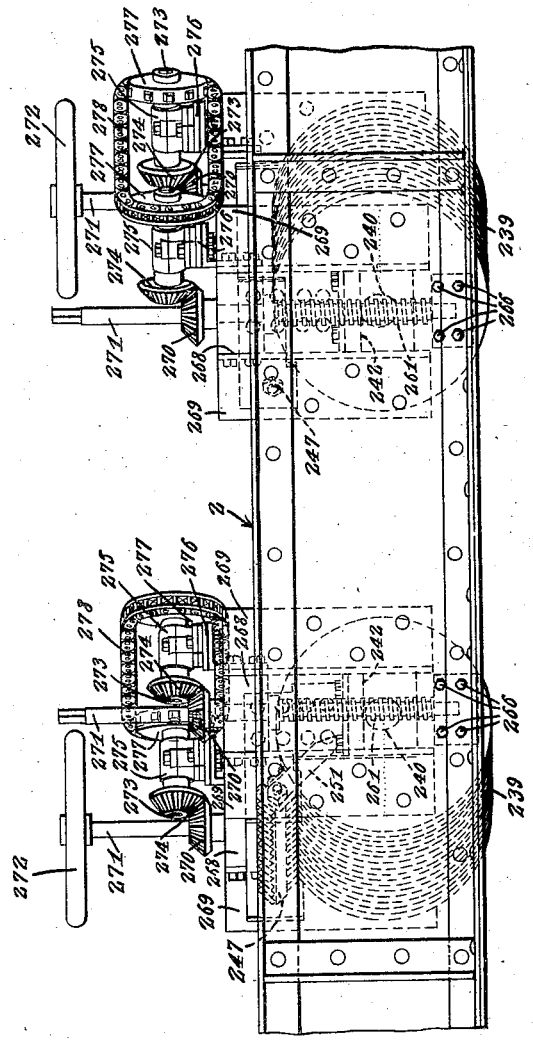

Oct. 4, 1927.
F. M. HARGRAVE
CUTTING MECHANISM
Original Filed Sept. 15, 1925     3 Sheets-Sheet 3
1,644,583
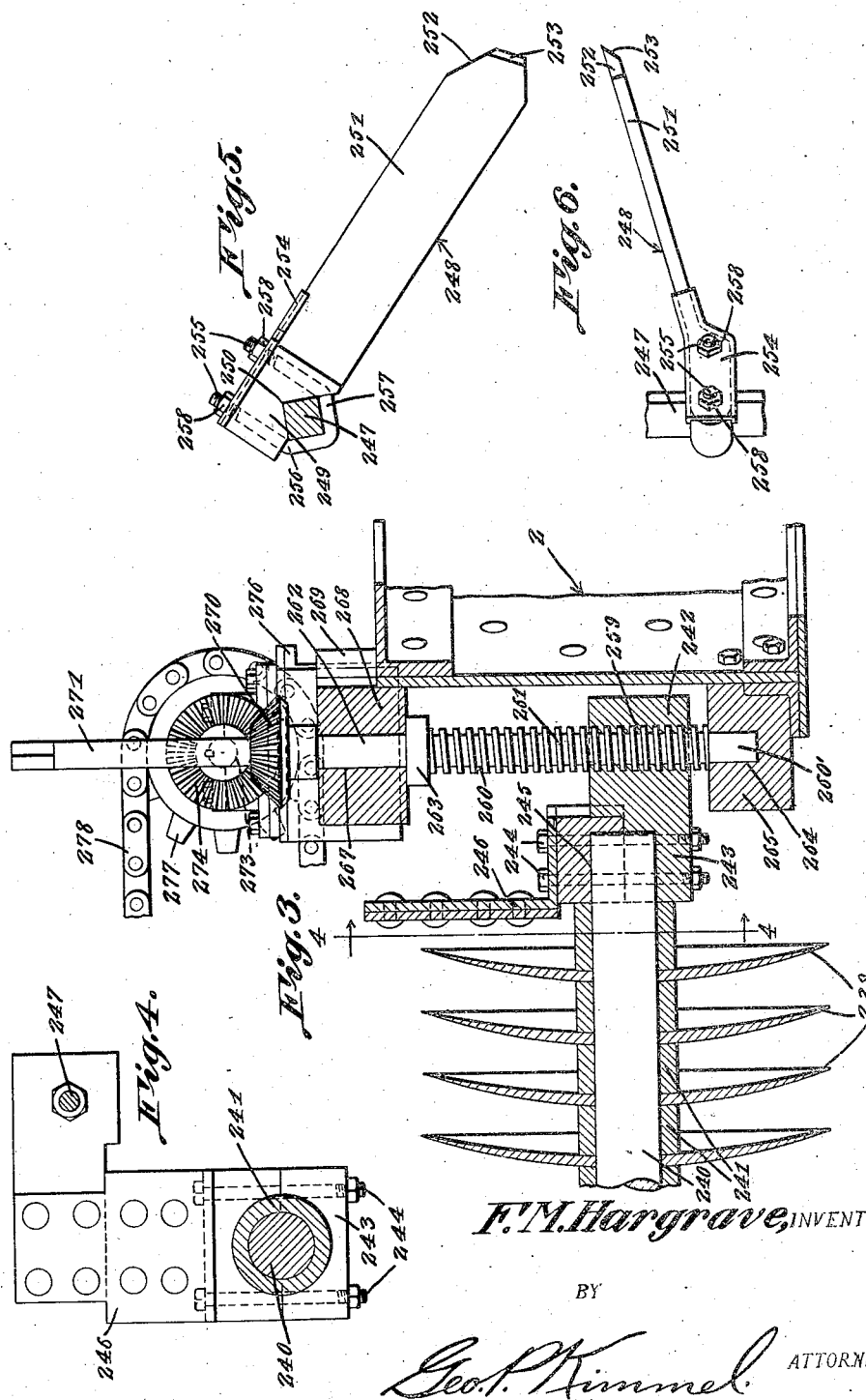

Patented Oct. 4, 1927.

1,644,583

UNITED STATES PATENT OFFICE.

FRED MERRILL HARGRAVE, OF CEDAR RAPIDS, IOWA.

CUTTING MECHANISM.

Original application filed September 15, 1925, Serial No. 56,508. Divided and this application filed January 25, 1927. Serial No. 163,498.

This invention relates to road building machines, more particularly to the cutting mechanism thereof, and is a division of my application filed September 15, 1925, Serial No. 56,508, and the invention has for its object to provide, in a manner as hereinafter set forth, a new and novel mechanism for cutting or tearing up the upper layer of the surface of a street, roadway or pavement.

Further objects of the invention are to provide, in a manner as hereinafter set forth, a mechanism for the purpose set forth which is comparatively simple in its construction and arrangement, strong, durable, thoroughly efficient in its use, conveniently adjusted and comparatively inexpensive to set up.

With the foregoing and other objects in view, the invention consists of the novel construction, combination and arrangement of parts as hereinafter more specifically described, and illustrated in the accompanying drawings wherein is shown an embodiment of a mechanism for the purpose referred to, but it is to be understood that changes, variations and modifications can be resorted to which fall within the scope of the claims hereunto appended.

In the drawings wherein like reference characters denote corresponding parts throughout the several views:

Figure 2 is a side elevation of the cutting mechanism showing the adaptation thereof in connection with a mobile support, the latter being broken away.

Figure 3 is a section on line 3—3 Figure 1.

Figure 4 is a section on line 4—4 Figure 3.

Figure 5 is a side elevation of one of the cleaners of scrapers.

Figure 6 is a fragmentary view, in plan, of one of the suspension rods for the support for the cleaners or scrapers.

Figure 1:
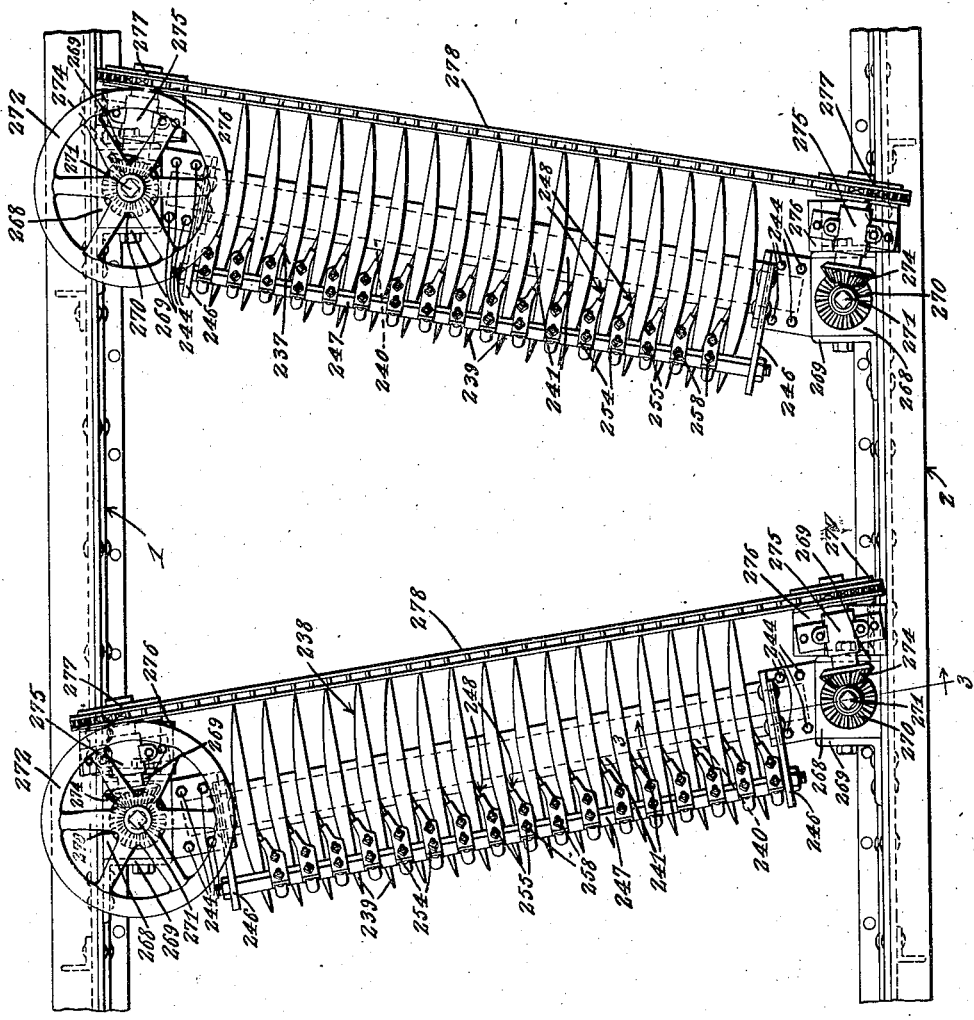
Figure 1 is a top plan view of a mechanism, in accordance with this invention, for cutting or tearing up the upper layer of the surface of a street, roadway or pavement and further illustrating the adaptation thereof in connection with a mobile support, the latter being broken away.

A cutting mechanism in accordance with this invention, is adapted to be carried by a mobile support and such support can include wheels and runners, and can be of a type as disclosed in my application Serial No. 56,508. The mobile support may be self-propelled or operated as a trailer behind a tractor, truck or other motive power, as referred to in my application Serial No. 56,508.

A cutting mechanism, in accordance with this invention is adapted to be carried by the sides of the mobile support and the said sides are generally referred to by the reference characters 1 and 2. As the mobile support, forms no part of this invention other than the side members 1, 2 thereof, said support is not shown or specifically referred to, as full reference to a mobile support is had in my application Serial No. 56,508. Each side of the mobile support will be hereinafter referred to as a side member.

Before specifically describing the elements of the cutting mechanism, it is thought advisable to briefly describe the function and arrangement thereof. The cutting mechanism comprises two batteries of cutting disks, one battery immediately behind the other. Each battery is so mounted that its passage, when held in contact with the pavement or roadway surface under treatment, will cut or tear up the upper layer of such surface. The disks of each battery are free to revolve about their common axis, and each disk is provided with a separate cleaning or scraping knife for the purpose of freeing the cutting edge or inside face of each disk from bituminous or other material which might adhere thereto. The disks are sharpened and of concave shape. The concave surface of the disks in the front battery face to the right, while the concave side of the disk in the second or rear battery face in an opposite direction. The purpose and effect of this reversal of the surface is to equalize lateral pressure and eliminate side thrust, the tendency being to straighten the path of the machine and not thrust it to one side or the other as would be the case with the disks faced in one direction. Each battery of disks is independently adjustable from a vertical standpoint and each battery can be operated alone or both may be operated together. The front battery may be set to penetrate to one depth while the rear battery may be set at a greater depth. The rear battery is so placed in position that the disks thereof operate on lines half way between the two disks immediately in front and forming a part of the front battery, thereby insuring that the entire surface of the pavement or roadway will be processed. The construction of one battery of disks, is the same as the other battery, with this exception that the concave disks of the forward battery referred to generally by the reference character 37 are oppositely disposed with respect to the concave disks of the rear battery referred to generally by the reference character 238. A further difference is that the front battery 237 extends in an opposite inclined plane with respect to the position in which the rear battery 238 is arranged, or in other words the batteries extend in opposite inclined planes with respect to each other. The front battery 237 extends transversely and forwardly at an inclination with respect to the machine, and the rear battery 238 extends transversely and rearwardly at an inclination with respect to the machine. The construction of both batteries is identical, thereby the description of one will apply to the other.

Each battery consists of a series of opposed concave cutting disks 239 of the desired diameter, and with the convex face of one disk opposing the concave face of the other throughout. The disks 239, are revolubly mounted on a shaft 240, and maintained equidistant with respect to each other by the spacing collars 241 carried by the shaft 240. Each end of the shaft 240 extends into a combined bearing and elevating block therefor, and which comprises an inner part 242 and an outer part 240 arranged at an angle with respect to the inner part 242. The outer part 243 is formed of two sections, secured together by holdfast devices 244, and provided with a socket 245 for the reception of the shaft 240. The outer part 243, of each of said elevating blocks, has secured thereto by holdfast devices 244, an up-standing bracket member 246 which projects above the disks 239, as well as projects rearwardly thereto. The bracket members 246 are connected together at the rear of their upper portion, by a polygonal-shaped suspension bar 247, upon which is seated a series of backwardly or forwardly extending and downwardly inclined cleaner or scraper elements 248, which engage the concave faces of the disks 239. Each of the cleaner elements at its rear end is provided with a head 249, formed at its bottom with a V-shaped notch 250 for seating on the bar 247. The blade of each of said cleaner elements is indicated at 251, and is disposed at an inward inclination with respect to the head 249. The forward end of the blade 251 is tapered, as at 252, and formed with a cutting edge 253. Mounted on the top of the head 249 and extending upon the top edge of the blade 251, at the rear thereof, is a flanged coupling plate 254. Extending upwardly through the head 249, as well as through the plate 254, are the arms 255 of a clamping yoke 256. The lower portion of the yoke 256, as indicated at 257, conforms in contour to the lower portion of the bar 247. Securing nuts 258 are mounted on the upper ends of the arms 255, and in connection with the yoke 256 and coupling member 254, fixedly clamp the cleaning element 248 in position, as shown in Figures 5 and 6, to the suspension bar 247, and by this arrangement the cleaning element 248 operating against the concave face of a disk 239 will clean the same. The cleaning elements 248 are stationary and the disks 239 revolve against the forward end of the cleaning elements.

The inner part 242, of the combined bearing and elevating blocks for the shaft 240, is formed with a vertically disposed opening 259 having the wall thereof threaded throughout, and engaging with said threaded wall, is an adjusting element for vertically moving the battery of disks from active position or for adjusting the depth of cut. As each adjusting element is of the same construction, but one will be described, as the description of one will apply to the other. Each adjusting element is formed of a vertically disposed shaft, referred to generally by the reference character 260, and which comprises a plane lower terminal portion 260', an intermediate threaded portion 261 which engages with the wall of the opening 259, and a plane upper terminal portion 262, provided at its lower terminus with a stop collar or boss 263. The lower terminal portion 260', is mounted in a socket 264, formed in a supporting block 265, secured by holdfast devices 266, to the lower portion of the inner face of a side member of the mobile support. The upper terminal portion 262 of the shaft 260, extends through an opening 267, formed in a bearing block 268, which is fixedly secured to a spaced pair of angle pieces 269 attached to and projecting above the top of a side member of the mobile support.

The shaft 268 has connected thereto a beveled pinion 270, and said shaft 260 is provided with a stem 271 for the reception of the hand wheel 272 for the purpose of operating the shaft when occasion requires.

The two shafts 261 of each battery, are simultaneously operated, whereby the two combined bearing and elevating blocks of each battery will be adjusted vertically simultaneously, and for this purpose the shaft 260 which is manually operated, is connected by transmission mechanism to the other shaft 260 to provide for the simultaneous operation of both shafts. The said transmission mechanism includes a beveled gear 270 at the upper end of each shaft 260, and further includes a counter shaft 273 provided with a beveled pinion 274. Two counter shafts 273 are employed, and the beveled pinions 274 thereof mesh with the beveled pinions 270 on the two shafts 260 of the battery. Each shaft 273 extends at an inclination through a bearing 275, carried by a support 276, fixed to a side of the section 2. The shafts 273 project forwardly from their bearings and each is provided with a sprocket pinion 277. The pinions 277 are connected by an endless chain 278 of the link type. By this arrangement the bodily adjusting of a battery, vertically and simultaneously from each end can be accomplished.

It is thought that the many advantages of a cutting mechanism, in accordance with this invention for employment in road building machines can be readily understood and although the preferred embodiment of the invention is as illustrated and described, yet it is to be understood that changes in the details of construction can be had which will fall within the scope of the invention as claimed.

What I claim is:

1. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, means for connecting the supports to said structure, and each of the disks of each of said sets being concave.

2. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, an adjusting mechanism for vertically shifting each support, said adjusting mechanisms carried by the supports and said structure and further providing means for coupling the supports to said structure.

3. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, an adjusting mechanism for vertically shifting each support, said adjusting mechanisms carried by the supports and said structure and further providing means for coupling the supports to said structure, and each of the disks of each of said sets being concave.

4. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, means for connecting the supports to said structure, a pair of bars each arranged rearwardly of and having its ends connected to a support, a set of spaced cleaner elements carried by each bar, each of the elements of each set projecting forwardly from a bar and extending downwardly at an inclination and further inwardly at an inclination towards one side of a disk and associated with the latter.

5. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, means for connecting the supports to said structure, each of the disks of each of said sets being concave, a pair of bars each arranged rearwardly of and connected to a support, a set of cleaner elements carried by each bar, each of the elements of each set projecting forwardly from a bar at a downward inclination and further inclining inwardly towards one side of a disk and associated therewith.

6. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, an adjusting mechanism for vertically shifting each support, said adjusting mechanisms carried by the supports and said structure and further providing means for coupling the supports to said structure, a pair of bars each arranged rearwardly of and above the supports and further connected to the latter, a set of spaced cleaner elements carried by each bar, each of the elements of each set projecting forwardly at a downwardly inclination and further inclining towards one side of a disk and associated therewith.

7. In a road building machine a mobile supporting structure, two sets of revoluble surface cutting disks arranged within and extending transversely of said structure, one set of disks inclining forwardly and the other set rearwardly with respect to said structure, a pair of supports, each common to a set of disks, an adjusting mechanism for vertically shifting each support, said adjusting mechanism carried by the supports and said structure and further providing means for coupling the supports to said structure, each of the disks of each of said sets being concave, a pair of bars each arranged above and rearwardly of a support and further connected with the latter, and a set of spaced cleaner elements carried by each bar, each of the elements of each set projecting forwardly at a downward inclination and further extending inwardly towards one side of a disk and associated therewith.

8. In a road building machine a mobile supporting structure, a pair of surface cutting mechanisms arranged in spaced relation and positioned within said structure transversely thereof, one of said mechanisms arranged in advance of the other, and one of said mechanisms extending forwardly at an inclination and the other rearwardly at an inclination with respect to said structure.

9. In a road building machine a mobile supporting structure, a pair of surface cutting mechanisms arranged in spaced relation and positioned within said structure transversely thereof, one of said mechanisms arranged in advance of the other, one of said mechanisms extending forwardly at an inclination and the other rearwardly at an inclination with respect to said structure, and means carried by each of said mechanisms and said structure for vertically adjusting said mechanisms independently with respect to said structure.

10. In a road building machine in accordance with claim 1, alternately disposing the disks of one set with respect to the disks of the other set.

In testimony whereof, I affix my signature hereto.

FRED MERRILL HARGRAVE.